United States Patent Office 3,317,463
Patented May 2, 1967

3,317,463
ESTER-ISOCYANATE REACTION PRODUCT
Edward Schonfeld, New York, N.Y., and Charles A. Fetscher, Short Hills, N.J., assignors to Nopco Chemical Company, Newark, N.J., a corporation of New Jersey
No Drawing. Filed Jan. 29, 1963, Ser. No. 254,594
18 Claims. (Cl. 260—47)

This invention relates to the protection of reactive isocyanate groups and more particularly this invention relates to a process for protecting reactive isocyanate groups, the novel blocking agents used in said process, and the composition of matter thereby produced.

Free isocyanate groups are known to be quite reactive with water and in particular with the moisture in the air. When a material containing a free isocyanate group reacts with moisture from the air or any other form of water, the resultant material is then completely useless for preparing polyurethanes and prepolymers. Therefore, the prior art recognizes that the free isocyanate groups must be protected. This protection may be accomplished in one of two ways. The active isocyanate group can be protected by storing the isocyanate group-containing material in a sealed container under anhydrous conditions, or the isocyanate group-containing material can be protected by reacting the active isocyanate group with a blocking agent such as phenol. When the isocyanate group is blocked by reaction with phenol, the isocyanate group is protected. When it is later desired to take advantage of the ordinary reactive nature of the isocyanate group, the blocked isocyanate group can be unblocked and again rendered reactive by heating to a temperature of about 160° C., thereby unblocking the isocyanate group and liberating phenol. Although, phenol is a satisfactory blocking agent for isocyanates, the use of temperatures of about 160° C. in releasing the isocyanate group from its blocked condition results in an economic disadvantage in the cost of creating and maintaining such a high temperature. Therefore, the temperature needed to release the blocked isocyanate group is an important consideration in selecting the blocking agent.

Another factor which must be considered in selecting a blocking agent is the volatility of the blocking agent. A volatile blocking agent has been desired because it was believed that the more volatile the material, the faster would be the release time of the blocking agent and the more complete would be the release of the blocking agent. Since the reaction whereby the isocyanate group is blocked is a reversible one, it would be expected that by using a more volatile material, the blocking agent would be more easily removed from the system and the isocyanate group could then be reacted with a material having an active hydrogen. It was believed that if the blocking agents were not removed, then the blocking agents would compete with the material having an active hydrogen for reaction with the free isocyanate groups. Therefore, volatile materials were generally used as blocking agents both to assure that the blocking agent would not compete with the material containing any active hydrogen for the free isocyanate groups, and to assure a faster release time. Higher molecular weight blocking agents were not desired because these materials generally have decreased volatility when compared to lower molecular weight blocking agents.

Volatile blocking agents such as phenol, however, suffered from several disadvantages in that their vapors are generally toxic. Furthermore, when a volatile blocking agent is used and it is removed during the process of reacting the polyisocyanate with a material containing two or more active hydrogen atoms to produce a hard resin, the escaping volatile blocking agent can cause voids and pinholes in the resin that is produced.

Accordingly, it is an object of this invention to provide a process for blocking reactive isocyanate groups.

Another object is to provide a process for blocking reactive isocyanate groups with a non-volatile, non-toxic, low temperature releasing blocking agent.

Still another object is to provide a process for blocking reactive isocyanate groups with a blocking agent which, after said blocking agent is released by heating, does not compete with the active hydrogen containing material for reaction with free isocyanate groups.

Other objects and advantages will become apparent from the following more complete description and claims.

We have unexpectedly discovered that the foregoing objects are readily accomplished by completely reacting compounds containing at least one reactive or free isocyanate group, such as isocyanate prepolymers and isocyanate monomers, with a p-hydroxy benzoate to form adducts of the isocyanate so that all of the free and unreacted isocyanate groups are blocked with the p-hydroxy benzoate. The completely blocked isocyanates are non-volatile, chemically and physically stable at room temperatures and at temperatures below about 100° C. in the presence of moisture and/or a compound containing at least one active hydrogen atom for protracted periods of time. However, when such completely blocked isocyanates are heated to temperatures of at least 120° C., the isocyanate is completely regenerated and made available for reaction with moisture and/or compounds containing active hydrogen atoms.

The active hydrogen containing substances with which isocyanate will react are substances which contain reactive hydrogen as determined by the Zerewitinoff method. This method is described in the Journal of the American Chemical Society 49, 3181 (1927). Typical groups containing reactive hydrogen are hydroxyl, carboxyl, and primary and secondary amino groups.

The adducts of this invention can be prepared by contacting the compound containing at least one free and unreacted isocyanate group at a temperature of from about 60° C. to about 110° C. with a p-hydroxybenzoate selected from the class consisting of alkyl and aryl p-hydroxybenzoates.

Generally speaking, blocking of a material having reactive isocyanate groups can be accomplished by adding at least about one mole preferably from about 1.0 to 1.5 moles, of the blocking agent, e.g. ethyl p-hydroxy benzoate, for each reactive isocyanate group present in the isocyanate compound. The mixture is then heated to a temperature of from about 60 to 110° C. and maintained there until a sample of the reaction mixure titrated with di-n-butyl amine indicates the absence of reactive isocyanate groups.

After the free isocyanate groups have been blocked, the material containing the now blocked isocyanate groups may be stored without regard to the effects of atmosphere moisture.

Any alkyl, aryl, substituted alkyl or substituted aryl ester of p-hydroxy benzoic acid can be used to block the free or unreacted isocyanate groups of the isocyanate compounds. This is so because the ester portion of the p-hydroxy benzoic acid ester is present only to remove the active hydrogen of the carboxyl group of p-hydroxy benzoic acid so it will not react with the isocyanate groups of the isocyanate-containing material. Thus, the nature of the ester portion of the p-hydroxy benzoic acid ester, so long as it contains no groups reactive with an isocyanate, is not critical since it in no way takes part in the blocking reaction. Thus our blocking agents can be represented by the formula

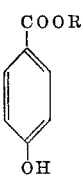

wherein R can be methyl, benzyl, ethyl, propyl, butyl, pentyl, hexyl, octyl, iso-octyl, decyl, pentadecyl, octadecyl, eicosyl, phenyl, tolyl, naphthyl, 2-ethylhexyl, 2-chlorohexyl, 2-nitrooctyl, 2-nitrobenzyl, and the like. Preferably R is any alkyl or aryl, alkaryl radical containing from 1 to 22 carbon atoms.

The invention is applicable to any material which contains at least one reactive isocyanate group. Thus, we can effectively block the isocyanate groups of the following compounds including their mixtures: ethylene diisocyanate; ethylidene diisocyanate; propylene-1,2-diisocyanate; butylene-1,3-diisocyanate; hexylene-1,6-diisocyanate; cyclohexylene - 1,2-diisocyanate, m-phenylene diisocyanate; 1,6-toluene diisocyanate; toluene-2,4-diisocyanate; toluene-2,6-diisocyanate; commercial mixtures composed of about 80% by weight of toluene-2,4-diisocyanate and 20% by weight of toluene-2,6-diisocyanate; 3,3'-dimethyl-4,4'-biphenylene diisocyanate; 3,3'-dimethoxy-4,4'-biphenylene diisocyanate; meta-phenylene diisocyanate; para-phenylene diisocyanate; para-para'-diphenyl diisocyanate, and substituted products thereof such as diphenyl-3'3-dimethyl-4,4'-diisocyanate, and diphenyl-3,3'-dimethoxy-4,4'-diisocyanate, or we may use 1,5-naphthylene diisocyanate; diphenyl-methane-4,4'-diisocyanate; pentamethylene-omega-omega' diisocyanate; hexamethylene-omega-omega' diisocyanate; toluene diisocyanate, diphenyl diisocyanate, triphenyl diisocyanate, chlorophenyl-2,4-diisocyanate; decamethylene diisocyanate; triisocyanates such as the triisocyanate adduct of one mol of a material such as trimethylolpropane 1,2,6-hexanetriol, castor oil, trimethylolethane and the like, with three moles of a diisocyanate, such as toluene diisocyanate, butylene diisocyanate, diphenyl diisocyanate, and the like.

This invention is also applicable to blocking prepolymers, such as the reaction product of di- or tri-isocyanate with a di or polyol such as glycerine, castor oil, trimethylol ethane, trimethylol propane, hexamethylene glycol, 1,6-hexane diol, pentaerythritol, sorbitol, manitol, and the like.

This invention is applicable, as previously stated, to protecting all and any materials having reactive isocyanate groups such as di, and polyisocyanates and prepolymers having reactive isocyanate groups.

The term prepolymer encompasses isocyanate terminated resins, said resins may be prepared from polyhydroxy polyesters and polyhydroxy polyethers by their reaction with a material having at least two free isocyanate groups. Among the polyesters to which our invention can be applied are saturated and unsaturated polyesters prepared by the polyesterification of a dicarboxylic acid or an anhydride, with a polyhydric alcohol or glycol. Exemplary of such dicarboxylic acids used in preparing the polyesters are the following as well as their mixtures: maleic, fumaric, itaconic, citraconic, mesaconic, succinic, adipic, methyl adipic, azelaic, sebacic, malonic, oxalic, suberic, phthalic, terephthalic isophthalic, tartaric, cyclohexane-1,2-dicarboxylic, isosebacic, citric, lactic, polyacrylic, thioipropionic, and the like, and anhydrides such as maleic anhydride, phthalic anhydride, and the like.

Exemplary of the di- or polyhydric alcohols or glycols which can be used in preparing the polyesters are the following as well as their mixtures: ethylene glycol, di-, tri- and poly-ethylene glycols, 1,2-propylene glycol, 1,4-butylene glycol, hexamethylene glycol, styrene glycol, decamethylene glycol, 1,3-butylene glycol, glycerine, 1,6-hexane diol, pentaerythritol, trimethylol propane, 1,2,6-hexanetriol, trimethylol ethane, 2-methyl-2,4-pentane diol, 2-ethyl-1,3-hexanediol, neopentyl glycol, sorbitol, manitol, and the like.

The polyethers may be prepared in any manner known to the art. For example, polyethers may be prepared by reacting a di or polyol with an alkylene oxide such as ethylene oxide, propylene oxide, butylene oxide, styryl oxide and the like. Polyethers may also be prepared by the polymerization of cyclic ethers such as dioxane etc., by the polymerization of alkylene oxides, and by the polyacetalization of a di or polyol with an aldehyde such as paraldehyde, paraformaldehyde, propialdehyde, butyraldehyde. Among the di or polyols which can be used in preparing polyethers are those which were previously exemplified as being among those capable of being used to prepare polyesters.

Among the polyethers which can be utilized in the preparation of polyether prepolymers are the ethylene oxide, propylene oxide, butylene oxide, styryl oxide, etc. condensates of amines, glycerine, hexane triol, trimethylol propane, pentaerythritol, etc. Other polyethers which can be utilized in forming the prepolymers which can be utilized in accordance with this invention include polyoxyethylene glycols polymers having molecular weights of 200, 400, 600, 800, 1,000, 2,000, and 4,000; polyoxypropylene glycols having molecular weights of 400 to 4,000; and copolymers prepared by the sequential addition of ethylene oxide to polyoxypropylene glycols. The copolymers can be represented by the formula

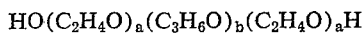
$$HO(C_2H_4O)_a(C_3H_6O)_b(C_2H_4O)_aH$$

The molecular weight of the base, i.e., the polyoxypropylene portion of the molecule can vary, e.g. from about 600 to 2,500. Hence, in these instances, each $b$ in the above formula can vary from about 10 to 43. The oxyethylene content can vary from, e.g. 10% to 20% by weight of the total. Exemplary of these materials having a molecular weight of between 800 and 1,000 for the base portion of the molecule, i.e., the polyoxypropylene portion, and from 10% to 20% by weight of the ethylene oxide in the molecule are materials having a molecular weight of between 2,101 and 2,500 and having from 10% to 20% by weight of ethylene oxide in the molecule. Other polyethers which may be utilized in this invention are the ethylene oxide and propylene oxide condensates of glycerine, 1,2,6-hexanetriol, treimethylol propane, pentaerythritol, etc.

A particularly valuable class of prepolymers which can be blocked by use of the blocking agents of this invention can be prepared by reacting a polyisocyanate with a glycol formed by reacting from about 1.67 to 2.0 moles of phenol or cresol having from 5 to 9 carbon atoms in the para position such as p-octyl or p-nonyl phenol or p-octyl or nonyl-o-cresol and the like, with one mole of formaldehyde, paraformaldehyde, trioxane, and the like. This glycol has the following structure.

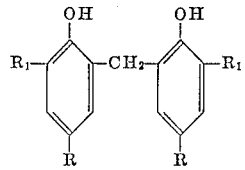

wherein R is an alkyl group of from 5 to 9 carbon atoms, and $R_1$ is either a hydrogen or a methyl group. This class of glycols may then be reacted with a polyisocyanate, said polyisocyanate being present in an amount sufficient to provide at least 2, preferably from 2 to 3, isocyanate groups for each hydroxyl group. This reaction can be carried out at a temperature of from about 40° C. to 50° C. for from about 4 to 5 hours until the desired isocyanate content is reached. This reaction with the isocyanate is preferably carried out under a dry nitrogen atmosphere in order to protect the isocyanate groups from reacting with atmospheric moisture. This isocyanate prepolymer can then be reacted with an alkyl or aryl p-hydroxy benzoate thereby protecting the free isocyanate groups and obviating the need for further protection of the isocyanate group against moisture.

Alternatively, the aforedescribed valuable class of glycols may be reacted with ethylene oxide or propylene oxide in an amount sufficient to provide for an average of from 1 to 2 moles, preferably 1.1 to 1.5 moles, of ethylene or propylene oxide per each phenolic hydroxyl group and then reacted with the polyisocyanate in the aforementioned amounts to form a prepolymer which may be blocked in accordance with this invention. The ethylene oxide or propylene oxide addition is carried out by reacting the glycol with ethylene or propylene oxide at a temperature of from about 150° C. to 200° C. If desired, the reaction may be carried out under pressure, e.g. up to 85 p.s.i. in the presence of about 0.1% of alkali hydroxide or alkali metal carbonate as catalyst, said 0.1% being based on the total weight of the glycol. The resultant product would conform to the following formula:

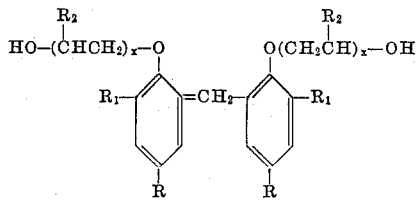

wherein R is an alkyl group of from 5 to 9 carbon atoms, $x$ is an integer from 1 to 2 and $R_1$ and $R_2$ are either a hydrogen or methyl group. This glycol can then be reacted with a suitable isocyanate in the aforedescribed manner and thereafter blocked as aforedescribed.

If desired, a tertiary amine may be added to the above mixture to catalyze the blocking reaction. If a tertiary amine is used, it may be present in amounts of from about 0.2% to 0.5% based on the weight of the entire mixture. While amounts in excess of 0.5% may be used, there is no advantage in using such amounts. Among the tertiary amines which may be used are N-ethyl morpholine, N-methyl morpholine, triethylamine, N,N,N',N'-tetramethyl-1, 3-butane diamine, triethylene diamine, N,N'-diethyl cyclohexyl amine, and the like.

The blocking agents of this invention are especially valuable in blocking polyester prepolymers having at least two free isocyanate groups, said polyester prepolymer being prepared by reacting a polyester having at least two free and unreacted hydroxy groups, said polyester being the reaction product of (1) from about 1 to 2 moles of an aromatic glycol having the formula:

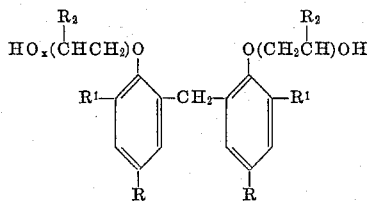

wherein R is an alkyl group of from 5 to 9 carbon atoms, X varies from 1 to 2, and each of $R^1$ and $R^2$ is selected from the group consisting of hydrogen and methyl, (2) with about one mole of a material selected from the group consisting of aromatic and aliphatic dicarboxylic acids and anhydrides thereof. The prepolymer is formed from the above polyester by reacting this polyester with an isocyanate containing at least two free and unreacted isocyanate groups; the isocyanate being present in an amount sufficient to provide at least 2, preferably from about 2 to 3, isocyanate groups for every free and unreacted hydroxyl group in the polyester. These prepolymers are blocked by reacting the prepolymer containing at least two active isocyanate groups with about 1 to 1.5 moles of p-hydroxy benzoate for every free isocyanate radical in said polyester.

When it is desired to use the blocked isocyanate containing material, unblocking and freeing of the isocyanate group is easily accomplished by heating said material at temperatures of from as low as about 120° C. to 180° C. in the presence of reactive hydrogen materials, e.g. polyols, polyamines, etc. for a period of from about 5 minutes to about 1 hour depending upon the temperature that is used. It should be noted that isocyanate containing materials blocked with phenol are released at temperatures from about 160° to 180° C. Thus, it can be seen that by using the blocking agents of this invention, the blocked isocyanate groups are more readily released and thereby rendered more readily capable of reacting with a material having an active hydrogen atom.

In order to more fully illustrate the nature of this invention and the manner of practicing the same, the following examples are presented. All parts given in the following examples are parts by weight.

EXAMPLE I

The purpose of this example is to illustrate the superiority of our novel blocking agents when compared with phenol as the blocking agent.

(A) *Preparation of a blocked isocyanate using a p-hydroxy benzoate*

0.8 mole of ethyl-p-hydroxybenzoate was dissolved in a solution of 75 ml. of toluene and 75 ml. of dioxane contained in a reaction vessel equipped with a stirrer. 0.4 mole of a mixture of 80% by weight of 2,4-toluene diisocyanate and 20% by weight of 2,6-toluene diisocyanate was then added dropwise with stirring at a temperature of 70 to 80° C. At the time of the addition and until the blocking reaction was completed, a dry nitrogen atmosphere was maintained so that the diisocyanate at no time came in contact with atmospheric moisture. Afte the addition was completed, the reaction temperature was raised to 110° C. and kept there for one hour. A white solid had commenced to form during the addition of the diisocyanate. This solid increased in volume as the reaction proceeded.

The reaction mixture was allowed to cool to room temperature and was filtered using a Buchner funnel. The white solid product was then collected from the filter paper and dried for several hours in a vacuum oven at 50° C.

(B) *Reacting the ethyl- p-hydroxybenzoate blocked toluene diisocyanate with Pluracol TP–1540*

9.5 grams of this white solid was added to 15.3 grams of Pluracol TP–1540, which is a propylene oxide adduct of trimethylpropane having a molecular weight of about 1500 obtained from Wyandotte Chemicals Corp. A paste was thereby formed. This paste was allowed to stand under atmospheric conditions for about two weeks. No reaction occurred between the two components as indicated by the fact that the components remained as a paste.

The paste was placed in an oven at 150° C. for one hour. A solid urethane rubber was obtained. No phenol odor was evident.

(C) *Comparison using phenol to block toluene diisocyanate*

The procedure of Part A was repeated except that phenol was used in place of the ethyl p-hydroxybenzoate. Again, a solid white product was obtained which was the blocked isocyanate. A paste was then prepared with Pluracol TP–1540, substituting an equivalent amount of the phenol blocked diisocyanate for the ethyl p-hydroxybenzoate blocked diisocyanate. The phenol diisocyanate was stored under the same conditions as in Part A. Again, there was no reaction.

(D) *Reacting the phenol blocked toluene diisocyanate with Pluracol TP-1540*

The paste of Part C was placed in an oven at 150° C. This time, however, three hours were required to form a solid urethane rubber. A phenol-like odor was present during the heating.

Thus, it can be seen that at the same temperature, and under the same conditions, the time required for unblocking and reacting the isocyanate is reduced by one-third when ethyl- p-hydroxybenzoate is used as the blocking agent when compared with using phenol as the blocking agent. Moreover, the phenol blocked product gave off a phenol odor in the process of unblocking whereas our ethyl p-hydroxybenzoate gave off no such phenol odor.

EXAMPLE II

The purpose of this example is to illustrate the preparation of a particularly novel prepolymer which can be blocked according to this invention.

(A) *Preparation of the bis-phenol*

7.97 parts by weight of trioxane were added to 91.15 parts by weight of p-tert-octyl phenol and the resulting mixture heated to 55° C. until the phenol melted. The tertiary octyl substituent was derived from diisobutylene and has the following structure:

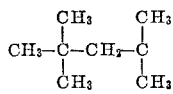

Diisobutylene is primarily a mixture of 2,4,4-trimethylpentene-1 and 2,4,4-trimethylpentene-2. 0.88 part by weight of a 37% by weight concentrated hydrochloric acid solution was carefully added to the mixture of trioxane and phenol and the temperature allowed to rise to 95° C. and maintained at 95° C. for 6 hours during which time the reaction mass was vigorously agitated. Thereafter, the reaction mass, which was a pinkish-white viscous material, was neutralized with 0.96 part by weight of a 50% by weight aqueous potassium carbonate solution and agitated for an additional half hour. The mass was then brought up to a temperature of 150° C. while under a nitrogen atmosphere and this temperature was maintained for 2 hours. The product, which was essentially a bis-phenol, was a pinkish tacky resin having a total alkali content of 0.05%.

(B) *Preparation of the bisphenol ethylene oxide condensate*

96.8 parts by weight of ethylene oxide were slowly added to 424 parts by weight of the bisphenol of Part (A) in the presence of 0.4 part by weight of potassium carbonate as a catalyst which was dispersed in the bisphenol. The temperature was maintained at 170° C. during the ethylene oxide addition. The resulting condensate which was the aromatic based glycol was purged with nitrogen. It was a clear amber, tacky resin at room temperature.

(C) *Preparation of a prepolymer*

A commercial mixture of 27.8 parts of toluene diisocyanate isomers composed of about 80% by weight of 2,4 toluene diisocyanate and 20% by weight of 2,6 toluene diisocyanate were placed in a reaction vessel. Then 0.02 part of N,N-diethyl cyclohexylamine as a catalyst, 72.2 parts of a xylene solution containing 68% by weight of the glycol formed by the addition of a total of 2.2 moles of ethylene oxide to the bisphenol of octyl phenol formed as described in Parts A and B of this example, were all added to the vessel. During the addition of the various reagents, the temperature was maintained at 35° C. and then was raised to 60° C. and maintained there for three hours until the free isocyanate content, determined by titration with 2 N di-n-butyl amine reached 6.9% by weight of the prepolymer solution. The entire reaction was run under a dry nitrogen atmosphere in order to protect the free isocyanate groups. The final product was adjusted to a 70% by weight solution of the prepolymer by the addition of xylene.

EXAMPLE III

The purpose of this example is to illustrate the blocking of a prepolymer prepared substantially as in Example II. In this Example III, a portion of said prepolymer was blocked with ethyl p-hydroxybenzoate and another portion was blocked with phenol. The time required to release the isocyanate groups of each of the blocked prepolymers at given temperatures was then recorded.

The prepolymer used was prepared substantially in the same manner as in Example II.

(A) *Blocking of the prepolymer using ethyl p-hydroxybenzoate*

100 grams of a 70% by weight solution of the prepolymer in xylene, prepared substantially as in Example II and having an isocyanate content of 6.9% by weight of the solution was placed in a reaction vessel equipped with a glass stirrer and having a nitrogen atmosphere. 26.4 grams of ethyl p-hydroxybenzoate and 35 grams of Cellosolve acetate (a solvent) were then added respectively to the reaction vessel, while stirring the reaction mixture. The reaction mixture was maintained at a temperature of from about 75° C. to 80° C. by heating while constantly stirring. The free isocyanate content of this mixture was determined by titrating with di-n-butylamine. Heating and stirring were continued until the free isocyanate concentration was less than 0.05% based upon the entire reaction mixture indicating that all of the free isocyanate groups had been blocked with ethyl p-hydroxybenzoate. The reaction was then halted by discontinuing the heating and removing the solution from the reaction vessel.

(B) *Preparation of a coating using the blocked prepolymer of Part A of this example*

50 grams of the blocked prepolymer solution of Part A of this example (containing 60% by weight of the prepolymer) was mixed, by simple stirring, with 22.6 grams of Pluracol TP-1540 and 14 grams of Cellosolve acetate.

Steel panels were coated with this varnish using a Bird applicator to produce a coating having a wet thickness of 3 mils. The coated steel panel was then placed in an oven which was at a pre-set temperature of 160° C. The coated panel was checked periodically to determine when the blocking agent had been released and the coating on the steel panel cured. This was done by examining the coated panel to determine if the coating was dry. When the coated panel was dry, it was considered that the blocking agent had been released, the solvent expelled, and that the remaining materials had reacted to give a cured coated steel panel. In this manner, it was determined that 60 minutes at a temperature of 160° C. were required to release the blocking agent and cure the coating to give a coating having a dried thickness of 1.5 mils.

By repeating the coating and curing procedure with another steel panel, it was determined that 35 minutes at a temperature of 180° C. were required to release the blocking agent and cure the coating.

The cured coating produced at 160° C. for 60 minutes had the following properties:

Hardness—2H pencil.
Flexibility—⅛″ mandrel.
Impact resistance—160 inch-pounds impact reverse and direct without separation of the coating from the steel panel.

The coating cured at 160° C. and was unaffected by a seven day exposure to the following materials: 10% hydrochloric acid, 5% sodium hydroxide, and benzene.

(C) Blocking of the prepolymer using phenol

The procedure of Part A of this example was repeated except that 14.9 grams of phenol and 23 grams of Cellosolve acetate were used in place of the 26.4 grams of ethyl p-hydroxybenzoate and 35 grams of Cellosolve acetate used in Part A of this example.

(D) Preparation of a coating using the blocked prepolymer of Part C of this example The procedure of Part B was repeated except that 25.5 grams of Pluracol TP–1540 and 16 grams of Cellosolve acetate was used in place of the 22.6 grams of Pluracol TP–1540 and 14 grams of Cellosolve acetate used in Part B.

This time, 75 minutes at 160° C. and 45 minutes at 180° C. were required each time to release the blocking agent, expel the solvent, and cure the coating. Moreover, strong phenol fumes were noticed at all times when releasing the blocking agent (phenol).

Thus, it can be seen from the foregoing, that the time required at a given temperature, to release the blocking, ethyl p-hydroxybenzoate, is less than the time required to release the blocking agent, phenol. Moreover, when ethyl p-hydroxybenzoate is released, there are no toxic fumes associated with its release. In contrast with this, however, when phenol is released, such release is accompanied by toxic fumes.

EXAMPLE IV

The purpose of this example is to illustrate the use of a different p-hydroxybenzoate as a blocking agent for an isocyanate.

The blocking agent used was lauryl p-hydroxybenzoate and was prepared as follows:

(A) Preparation of lauryl p-hydroxybenzoate 41.5 grams (0.25 mole) of ethyl p-hydroxybenzoate, 46.5 grams (0.25 mole) of lauryl alcohol and a trace of p-toluene sulfonic acid as a catalyst, were placed in a reaction vessel fitted with a sparger and a distillation apparatus consisting of a condenser and a collection flask. The mixture was then heated, under a nitrogen atmosphere, to 220° C. and maintained there for 7 hours during which time 11.0 ml. of ethanol were collected. (Theoretical yield of ethanol is 14.7 ml.) At the end of the seven hours, heating was discontinued, and the product was allowed to stand until it cooled to room temperature. The resultant lauryl p-hydroxybenzoate was off-white in color. The acid value of the product was determined and found to be 0.76.

(B) Preparation of a blocked isocyanate using lauryl p-hydroxybenzoate

The reactants used were as follows:

| | Grams |
|---|---|
| Lauryl p-hydroxybenzoate | 30.6 |
| Toluene diisocyanate (80% by weight of 2,4-toluene diisocyanate and 20% by weight of 2,6-toluene diisocyanate) | 8.7 |
| Xylene | 30.0 |

Blocking of the isocyanate groups was accomplished in the manner of Example I, Part A except that during the addition of toluene diisocyanate, the reaction mass was heated to and maintained at 90° C. After the addition, the temperature was maintained at 90° C. until a sample of the reaction mass titrated with di-n-butylamine demonstrated that the free isocyanate content was zero.

(C) Reacting the lauryl p-hydroxybenzoate blocked toluene diisocyanate with Pluracol TP–1540

The reactants and amounts used were as follows:

| | Grams |
|---|---|
| Blocked isocyanate of Part B | 19.6 |
| Pluracol TP–1540 | 23.6 |

The above mixture was heated in an oven for 75 minutes at 180° C. A solid urethane rubber was thus obtained. No phenol odor was evident during and after the heating.

As we have demonstrated, the blocking agents of this invention are effective in reducing the time required for unblocking at given temperature when compared to phenol as a blocking agent. Moreover, our novel p-hydroxybenzoate esters when heated for purposes of unblocking the isocyanate groups, do not form toxic volatile phenol.

EXAMPLE V

The purpose of this example is to illustrate the preparation of a polyester, the reaction of said polyester with toluene diisocyanate, and the blocking of the free isocyanate groups using a novel blocking agent according to this invention.

(A) Preparation of an aromatic glycol

An aromatic glycol was prepared in the manner of Example II, Parts A and B.

(B) Preparation of the polyester 0.5 mole of said aromatic glycol is then placed in a flask fitted with an agitator, a Dean-Stark trap and a nitrogen inlet tube, and then melted in the presence of 100 cc. of benzene by heating at 90° C. Thereafter, 0.485 mole of maleic anhydride are then added to the flask. The reaction temperature is then raised to 150° C. and the water of esterification is then azeotropically distilled off as it forms. A nitrogen atmosphere is maintained during the reaction. After an acid value of about 39 is reached, a vacuum is then carefully applied and the temperature is then raised to about 160° C. for about one-half hour.

The resultant polyester resin is then cooled.

(C) Reaction of toluene diisocyanate with the polyester of Part B

The reaction is carried out in the manner of Example II, Part C. There is present 1.1 moles of toluene diisocyanate present for each equivalent hydroxyl group.

(D) Blocking of the polyester prepolymer

Blocking is then accomplished in the manner of Example I, Part A. The same mole ratios used in Part A of Example I are used here, i.e. 0.8 mole of ethyl p-hydroxybenzoate and 0.4 mole of the polyester-toluene diisocyanate adduct.

While this invention has been described in terms of certain preferred embodiments and illustrated by means of specific examples, the invention is not to be construed as limited except as set forth in the following claims.

What we claim as new and desire to secure by Letters Patent is:

1. A process for protecting reactive isocyanate groups comprising the steps of (1) contacting at a temperature of from about 60 to about 110° C., a material containing at least two reactive isocyanate groups with (2) an ester of the formula.

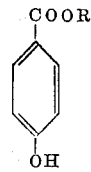

wherein R is selected from the class consisting of alkyl, aryl, and alkaryl groups, said groups containing from 1 to 22 carbon atoms and said ester being present in a ratio of at least one mole of said ester for each reactive isocyanate group.

2. A process according to claim 1, wherein R is ethyl.
3. A process according to claim 1, wherein R is propyl.
4. A process according to claim 1, wherein R is butyl.
5. A process according to claim 1, wherein R is lauryl.

6. The process of claim 1 in which said material containing at least two reactive isocyanate groups is selected from the group consisting of polyester prepolymers and polyether prepolymers.

7. A process according to claim 1, wherein said material containing at least two reactive isocyanate groups is a prepolymer, said prepolymer being prepared by reacting
(A) a polyester, having at least two free and unreacted hydroxyl groups, said polyester being prepared by reacting
(1) from about 1.1 to 2.0 moles of an aromatic glycol having the formula

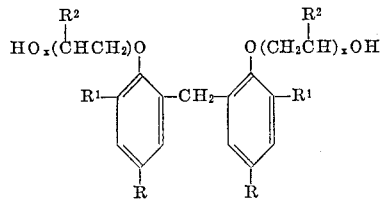

wherein R is an alkyl group of from 5 to 9 carbon atoms, x varies from 1 to 2, and each of $R^1$ and $R^2$ is selected from the group consisting of hydrogen and methyl, and
(2) with about one mole of a compound from the group consisting of aromatic dicarboxylic acids, aliphatic dicarboxylic acids and anhydrides thereof, and
(B) a polyisocyanate, said polyisocyanate being present in an amount sufficient to provide at least 2 isocyanate groups for every free and unreacted hydroxyl group in the polyester.

8. A process according to claim 1, wherein said material is a prepolymer, said prepolymer being the reaction product of
(A) an aromatic glycol having the formula

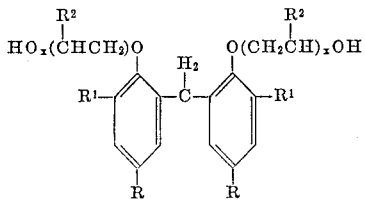

wherein R is an alkyl group of from 5 to 9 carbon atoms, x is an integer of from 1 to 2, and each of $R^1$ and $R^2$ is selected from the group consisting of hydrogen and methyl,
(B) with a polyisocyanate, said polyisocyanate being present in an amount sufficient to provide at least two isocyanate groups for every free and unreacted hydroxyl group in the glycol.

9. A thermally reversible adduct, said adduct being stable at temperatures up to about 100° C., said adduct comprising the reaction product of a compound containing at least two free isocyanate groups and a material having the following formula:

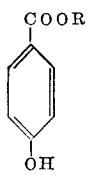

wherein R is selected from the group consisting of aryl, alkyl, and alkaryl groups, said groups containing from 1 to 22 carbon atoms and said reaction product being formed by the reaction of at least one mole of said material for every free isocyanate group contained within said compound.

10. The adduct of claim 9, wherein R is ethyl.

11. The adduct of claim 9, wherein R is propyl.

12. The adduct of claim 9, wherein R is lauryl.

13. A blocked polyester prepolymer comprising the reaction product of a polyester prepolymer having at least two reactive isocyanate groups and a p-hydroxybenzoate having the following formula:

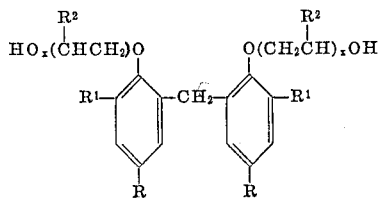

wherein R is selected from the group consisting of aryl, alkyl and alkaryl groups, said groups containing from 1 to 22 carbon atoms, said polyester prepolymer being prepared by reacting
(A) a polyester, having at least two free hydroxyl groups, said polyester being prepared by reacting
(1) from about 1.1 to 2 moles of an aromatic glycol having the formula

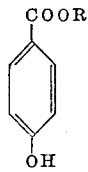

wherein R is an alkyl group of from 5 to 9 carbon atoms, x is an integer of from 1 to 2, and each of $R^1$ and $R^2$ is selected from the group consisting of hydrogen and methyl, and
(2) with about one mole of a compound from the group consisting of aromatic dicarboxylic acids, aliphatic dicarboxylic acids and anhydrides thereof, and
(B) a polyisocyanate, said polyisocyanate being present in an amount sufficient to provide at least two isocyanate groups for every free and unreacted hydroxyl group in the polyester,
said blocked polyester prepolymer being prepared by contacting at a temperature of from about 60° C. to about 110° C., said polyester prepolymer with said p-hydroxybenzoate which is present in a ratio of at least one mole of said ester for each equivalent of said reactive isocyanate groups.

14. A blocked polyester prepolymer according to claim 13, wherein said p-hydroxybenzoate is ethyl p-hydroxybenzoate.

15. A blocked polyester prepolymer according to claim 13, wherein said p-hydroxybenzoate is propyl p-hydroxybenzoate.

16. A blocked polyester prepolymer according to claim 13, wherein said p-hydroxybenzoate is butyl p-hydroxybenzoate.

17. A blocked polyester prepolymer according to claim 13, wherein said p-hydroxybenzoate is lauryl p-hydroxybenzoate.

18. A process for unblocking a thermally reversible adduct comprising heating said adduct at a temperature of from about 120° C. to about 180° C. for a period of from about 5 minutes to about 60 minutes, said adduct comprising the reaction product of a compound containing at least two free isocyanate groups and a material having the following formula:

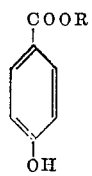

wherein R is selected from the group consisting of aryl, alkyl and alkaryl groups, said groups containing from 1 to 22 carbon atoms and said reaction product being formed by reaction of at least one mole of said material for every free isocyanate group contained within said compound.

References Cited by the Examiner

UNITED STATES PATENTS

| | | | |
|---|---|---|---|
| 2,861,981 | 11/1958 | Frank et al. | 260—75 |
| 2,982,754 | 5/1961 | Sheffer et al. | 260—75 |
| 3,140,227 | 7/1964 | Liebling et al. | 260—871 |

OTHER REFERENCES

Leffler et al., Journal of Am. Chem. Soc., vol. 70, pages 3439–3442 (1948).

WILLIAM H. SHORT, *Primary Examiner.*

C. A. WENDEL, *Assistant Examiner.*